United States Patent Office 2,837,857
Patented June 10, 1958

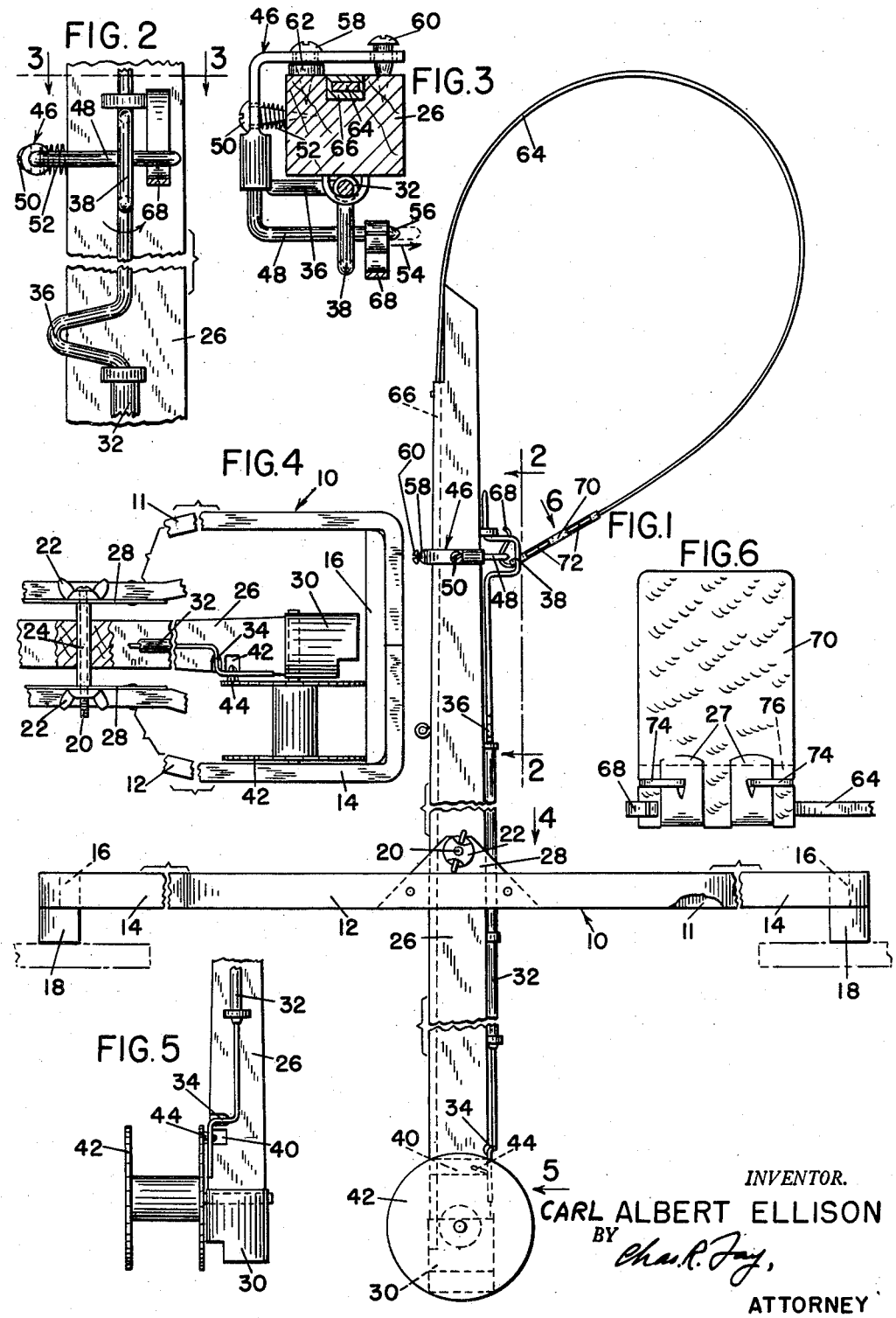

2,837,857
ICE-FISHING TILT
Carl Albert Ellison, Worcester, Mass.

Application April 1, 1955, Serial No. 498,679

5 Claims. (Cl. 43—17)

This invention relates to a new and improved ice-fishing tilt, and the principal objects of the invention include the provision of a base, an upright member thereon for disposition in an ice hole and depending thereinto providing a reel below the surface of the ice and a snap-release indicating signal preferably in the form of a flag for indicating the taking of bait or hooking of a fish; the provision of such an ice-fishing tilt that provides for resistance to release of the signal except where a fish has taken the bait and is not merely nibbling, so that a greater percentage of strikes are actually hooked and caught by the fisherman and a less number of strikes without actually hooking will occur; the provision of an ice-fishing tilt as above described including an adjustment to the release of the signal for using different sizes of baits, so that a large live minnow may be used as bait without any chance for it to trip the signal, or where a smaller bait is used, the adjustment may be made lighter, so that the signal will trip quickly but again without tripping merely by action of the bait.

Other objects of the invention include the provision of a base preferably made of light-weight metal such as aluminum having a new and improved latching connection with the reel when the upright is folded with respect thereto; the provision of means for allowing oscillation of the upright upon the horizontal base under action of the wind but without the likelihood of the signal being tripped, such oscillation causing the bait to move in the water and thus attracting a much larger number of fish, so that the fisherman using the novel tilt will catch more fish.

Still further objects of the invention include the provision of a new and improved attaching means for the flag to the signal spring; a weight applied to the bottom of the upright to provide for greater stability in high winds, and a friction clamp between the support and the upright for regulating the oscillation of the latter; a new and improved tubular housing for the signal spring which may be fully enclosed therein when not in use; the provision of a new and improved releasing mechanism including a transverse notch in the upright adjacent the reel, so that the reel may be attached closely adjacent to the upright and includes a projection which traverses the cut-away portion to release the signal device.

Other objects and advantages of the invention will appear hereinafter.

Reference is to be had to the accompanying drawings, in which—

Fig. 1 is a view in elevation illustrating the tilt set for operation, parts being broken away;

Fig. 2 is an enlarged view in section on line 2—2 of Fig. 1, parts being broken away;

Fig. 3 is a section on line 3—3 of Fig. 2;

Fig. 4 is a plan view of a part of the frame and the tilt bar, looking in the direction of arrow 4 in Fig. 1, parts being broken away and certain of the parts being in section;

Fig. 5 is a view in elevation, looking in the direction of arrow 5 in Fig. 1; and Fig. 6 is an enlarged view, looking in the direction of arrow 6, Fig. 1; and illustrating the application of the flag to the spring signal device.

As shown in the drawing, there is a base 10 which comprises an open frame having runs 11 and 12 terminating at the ends thereof in enlarged loops 14 which may be reenforced by cross members 16 and are provided with feet or the like 18, so that the member 10 will not become frozen to the ice but is so spaced from the ice by these feet.

Centrally of the frame, there is provided a cross spindle indicated at 20, this spindle being threaded at its ends for the reception of a pair of wing nuts 22 at the outer parts of the runs 11 and 12 of the frame. Between the loops 14, the runs 11 and 12 are narrowed down and the spindle 20 receives a metallic sleeve 24 thereon passing through and fixed to the upright 26. At each end of the sleeve 24, there may be provided a washer 28. By manipulating the thumb-pieces 22, friction is imposed upon the washers 28 and thence to the ends of the sleeve 24. Sleeve 24 being fixed to the upright 26, transfers the friction effect thereto and therefore it will be seen that the upright 26 may be loosely mounted to easily swing in the breeze or it may be fixed fast to the frame in upright condition as in Fig. 1 or any frictional pressure between the two conditions may be imparted to the upright.

The upright is adapted to fold within the frame 10 as indicated in Fig. 4, or it may be swung to an upright position for use as shown in Fig. 1, and a weight 30 applied at the lower end thereof tends to hold the same upright and helps to prevent the entire tilt from being blown over in relatively strong breezes.

The upright is provided with a closed tube 32 and this tube rotatively holds an elongated wire therein, this wire having an exposed offset portion at its lower end at 34 and an offset portion 36 at its upper end and an offset 38 portion thereabove in spaced relation as seen in Fig. 2.

The lower offset portion is in the form of a crank and coincides with a cut or recess 40 which extends across the upright 26 just above the weight 30. A more or less conventional reel 42 is applied rotatively to the upright 26 and a tab or projection 44 thereon is adapted to pass through the recess 40 when the reel is rotated and impinged upon the crank 34 to rotate the wire described above about its longitudinal axis approximately 90°. The offset portion 38 will limit the motion of the wire to the right in Fig. 2 and the offset portion 36 at 90° to offset portion 38 limits the motion in the opposite direction.

When the offset portion 38 extends outwardly at a 90° angle from the upright as in Figs. 1 and 2, the crank at 34 will be located closely adjacent one end of the recess 40. When the projection 44 turns the wire, the offset portion 38 will move almost to a 90° position to contact the surface of the upright and in this case the offset portion 36 will then extend outwardly.

There is a U-shaped member generally indicated at 46 and this member has one leg in the form of a wire at 48 which is positioned to extend through the offset portion (see Figs. 1 and 2). The U-shaped member 46 is mounted on a fastener or screw 50 which has a coil spring 52 associated therewith to normally cause the end 48 of the U-shaped member 46 to be held against the head of screw 50 to the left in Fig. 3.

When a fish takes the bait and thus rotates the reel 42, the projection 44 will pass through recess 40 in a clockwise direction in Fig. 1 and engaging the offset 34 will turn the wire, causing offset 38 to engage hook 68 and push it off the end of wire 48, so that the spring wire 64 will snap upwardly to apprise the fisherman that the bait has been taken. The wire 64 is provided with a colored signal flag 70 which is connected thereto by U-shaped spring clips 72 which are located in position by additional clips 74 also of U-shape and locking the clips 72 in position, the flag 70 being folded over the spring wire 64 as indicated at 76, so that the signal flag will never come loose from the wire 64.

It will be seen that if it is desired for the signal to be operated only upon a relatively strong pull on the reel, the screw 50 may be turned up as above described to move the wire 48 to the right in Fig. 3, thus requiring a greater throw by offset 38, so that more effort is required to slide the hook 68 from the wire 48. This adjustment may be lessened by turning the screw in the opposite direction to allow the spring 52 to position the end of the wire 48 in a position to receive hook 68 more adjacent its end.

By loosening the thumb-nuts 22, the upright 26 will be loosened to swing in the breeze, thus causing the bait to be moved in the water to attract more fish, but the weight 30 will prevent the tilt from being blown over. Also when the tilt is folded, the reel will pass a dead center position to engage the inner edge of the member 16 with just sufficient pressure to hold the upright in parallel relation folded within the frame 10. At the same time, however, the device is equally easy to extend.

Having thus described my invention and the advantages thereof, I do not wish to be limited to the details herein disclosed, otherwise than as set forth in the claims, but what I claim is:

1. An ice-fishing tilt comprising an upright, a stand therefor, a spring signal device, means to hold the latter tensioned, means to release the spring signal from the holding means, and means to adjust the degree of force required to release the signal, said holding means comprising a free-ended element, the adjusting means including means to move the element, the spring signal device including a hook to latch onto the element, and the releasing means including means to translate the hook along the element past the free end thereof.

2. An ice-fishing tilt comprising an upright, a reel thereon, a stand therefor, a spring signal device, a hook thereon, an elongated free-ended element to hold the latter tensioned, means to release the spring signal from the holding element, and means to adjust the degree of force required to release the signal, said last-named means moving the element longitudinally, the signal releasing means including a member to engage the hook and move it off the element, said member being actuated by rotation of the reel.

3. A folding fish tilt comprising an open elongated loop stand member, an upright in the loop, means pivoting the former to the latter intermediate the ends thereof, a reel on the upright at one end and a signal device at the other end of the upright, said reel contacting with an end of the loop past a dead center to latch the upright in the loop in folded condition therein.

4. An ice-fishing tilt comprising a stand, an upright pivoted thereto intermediate the ends thereof, a free-ended spring strip signal on the upright adapted to be bent over to be tensioned and released to spring upright, a hook at the free end of the spring strip, a U-shaped member embracing the upright, said hook being adapted to hook over an arm of the U in tensioned condition of the spring strip, means including a wire and a radial arm on the wire to engage the hook to slide the same off the free end of the arm of the U to release the strip, a reel on the upright, means on the reel to turn the wire and radial arm to move the hook, and means movably mounting the U-shaped member to extend or selectively retract the free end of the arm to which the hook is to be applied to vary the point of release thereof.

5. The ice-fishing tilt of claim 4 wherein said last-named means includes a fulcrum for the U-shaped member, a spring to bias the said arm of the U to retracted position and means to adjust the U-shaped member against the spring action to move the arm to extended position thereof.

References Cited in the file of this patent
UNITED STATES PATENTS

| | | |
|---|---|---|
| 445,491 | Biesen | Jan. 27, 1891 |
| 1,451,124 | Stolze | Apr. 10, 1923 |
| 2,448,346 | Baugh et al. | Aug. 31, 1948 |
| 2,518,517 | Baulski | Aug. 15, 1950 |
| 2,575,156 | Baugh et al. | Nov. 13, 1951 |
| 2,651,875 | Brockman | Sept. 15, 1953 |
| 2,654,176 | Kachelski et al. | Oct. 6, 1953 |